(12) United States Patent
Elio

(10) Patent No.: US 6,312,052 B1
(45) Date of Patent: Nov. 6, 2001

(54) ADJUSTMENT MECHANISM

(75) Inventor: Paul A. Elio, Phoenix, AZ (US)

(73) Assignee: Elio Engineering Inc., Phoenix, AZ (US)

( * ) Notice: Subject to any disclaimer, the term of this patent is extended or adjusted under 35 U.S.C. 154(b) by 0 days.

(21) Appl. No.: 09/490,509

(22) Filed: Jan. 25, 2000

Related U.S. Application Data

(60) Provisional application No. 60/117,072, filed on Jan. 25, 1999.

(51) Int. Cl.$^7$ .............................. B60N 2/06; F16H 21/44
(52) U.S. Cl. ........................ 297/344.1; 74/109; 74/530; 248/430
(58) Field of Search ............................. 297/344.1, 361.1; 74/89.17, 530, 109; 248/429, 430

(56) References Cited

U.S. PATENT DOCUMENTS

| | | |
|---|---|---|
| 2,946,326 | 7/1960 | Bates et al. . |
| 3,403,581 * | 10/1968 | Harness .............................. 74/530 X |
| 4,408,799 | 10/1983 | Bowman . |
| 4,969,621 | 11/1990 | Munchow et al. . |
| 5,163,736 | 11/1992 | Aljundi . |
| 5,382,076 | 1/1995 | Scheck et al. . |
| 5,950,978 | 9/1999 | Eguchi et al. . |
| 6,058,798 * | 10/1968 | Lantzsch ............................ 74/530 X |

* cited by examiner

*Primary Examiner*—Anthony D. Barfield
(74) *Attorney, Agent, or Firm*—Parsons & Goltry; Robert A. Parsons; Michael W. Goltry

(57) ABSTRACT

An adjustable seat including a seat frame and a rack mounted to a substrate. First and second pinions are rotatably carried by the frame and meshingly engage the rack for relative movement of the rack. The second pinion is movable between an open position allowing rotation of the pinions, and an engaged position wherein the pinions are mutually engaged with each other and the rack, preventing relative movement of the rack and rotation of the pinions. A cam engages the second pinion for moving it between the open position and the engaged position.

13 Claims, 4 Drawing Sheets

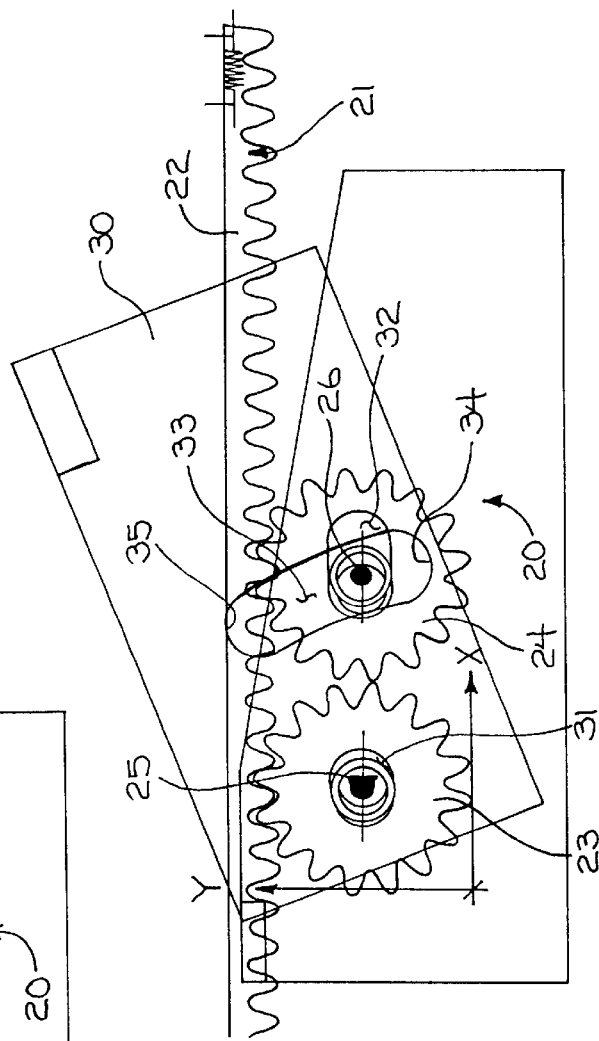
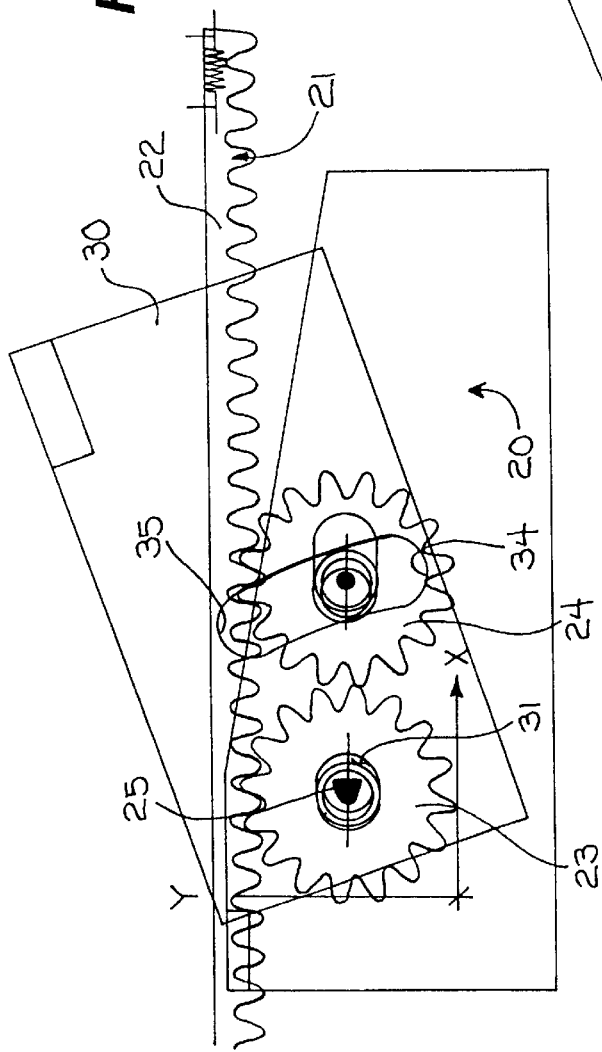
FIG. 3
FIG. 4

ADJUSTMENT MECHANISM

CROSS-REFERENCE TO RELATED APPLICATIONS

This application claims the benefit of U.S. Provisional Application Ser. No. 60/117,072, filed Jan. 25, 1999.

BACKGROUND OF THE INVENTION

1. Field of the Invention

This invention relates to seating devices.

Are particularly, the present invention relates to adjustment mechanisms for seating devices.

In a further and more specific aspect, the present invention concerns adjustment mechanisms for vehicle seating.

2. The Prior Art

Within the art of adjustment mechanisms for seating, many and diverse devices have been developed. Most notable among these is copending U.S. patent application entitled "Adjustable Support Apparatus and Architecture for Adjusting Support Apparatus", Ser. No. 09/092,675, now U.S. Pat. No. 6,070,935, filed Jun. 5, 1998 by the same inventor. While this mechanism functions extremely well, and costs less than most adjustment mechanisms, the mechanism is relatively complex. Complexity increases the time of fabrication, the material requirements, and the space used, resulting in increased costs.

It would be highly advantageous, therefore, to remedy the foregoing and other deficiencies inherent in the prior art.

Accordingly, it is an object the present invention to provide an adjustment mechanism with reduced complexity.

Another object of the present invention is to provide an adjustment mechanism which is easily fabricated and inexpensive.

And another object of the present invention is to provide an adjustment mechanism which is easily operated.

Still another object of the present invention is to provide an adjustment mechanism which is very robust.

Yet another object of the present invention is to provide an adjustment mechanism which permits substantially infinite adjustability.

SUMMARY OF THE INVENTION

Briefly, to achieve the desired objects of the present invention in accordance with a preferred embodiment thereof, provided is an adjustment mechanism including a rack, and a first pinion meshingly engaging the rack for rotation of the first pinion and relative movement of the rack and first pinion. A second pinion meshingly engages the rack for rotation of the second pinion and relative movement of the rack and the second pinion. The second pinion is movable between an open position wherein the first pinion and the second pinion can be rotated, and an engaged position wherein the first pinion and the second pinion are mutually engaged with each other and the rack. The engagement prevents relative movement of the rack and rotation of the first pinion and the second pinion. A cam engages the second pinion for moving the second pinion between the open position and the engaged position.

In another embodiment, provided is an adjustable seat including a seat frame, and a rack mounted to a substrate. A first pinion is rotatably carried by the frame and meshingly engages the rack for movement of the frame relative the rack. A second pinion is rotatably carried by the frame and meshingly engages the rack for relative movement of the frame relative the rack. The second pinion is movable between an open position wherein the first pinion and the second pinion can be rotated, and an engaged position wherein the first pinion and the second pinion are mutually engaged with each other and the rack. The engagement prevents relative movement of the rack and frame, and rotation of the first pinion and the second pinion. A cam engages the second pinion for moving the second pinion between the open position and the engaged position.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 3 is a view very similar to the view of FIG. 2;

FIG. 4 is a view very similar to the view of FIG. 3;

DETAILED DESCRIPTION OF A PREFERRED EMBODIMENT

Figure 1:
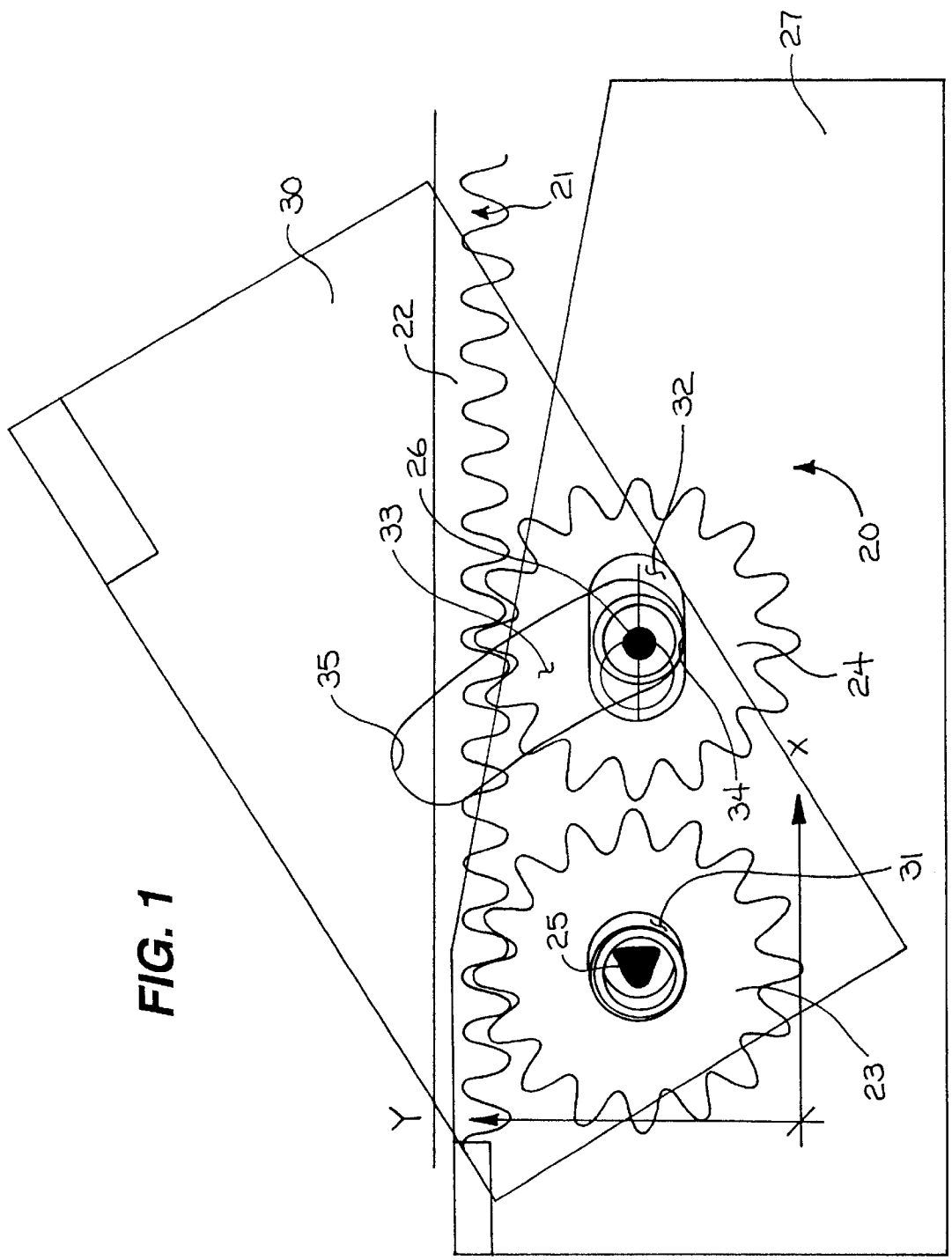
FIG. 1 illustrates a side elevational view of an adjustment mechanism with first and second pinions shown as they would appear in the open orientation and the cam shown as it would appear in the first position.
Figure 2:
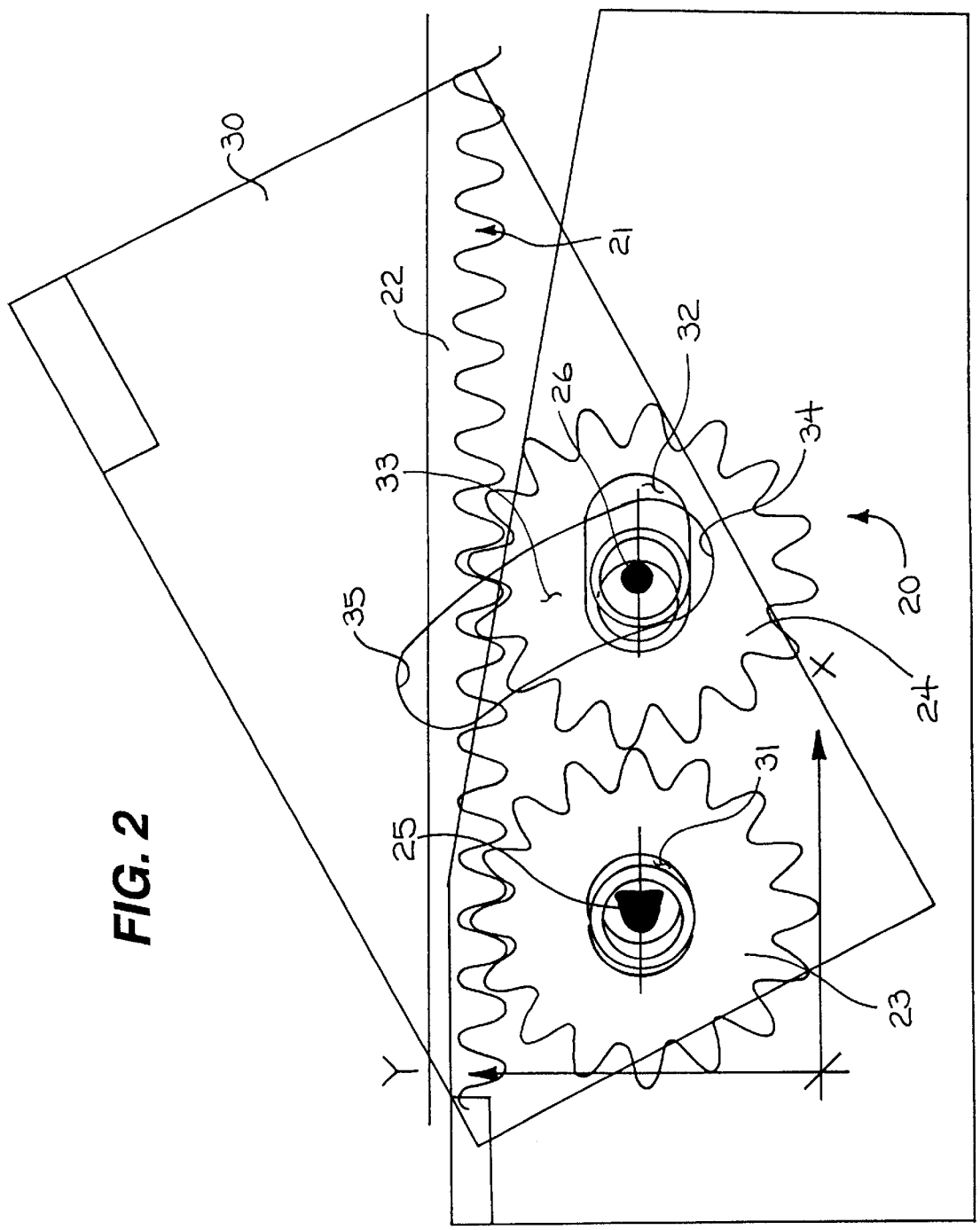
FIG. 2 illustrates a side elevational view of the adjustment mechanism of FIG. 1 with the cam shown positioned between the first and second positions and the first and second pinions shown as they would appear partially engaged between the open and closed orientations.
Figure 5:
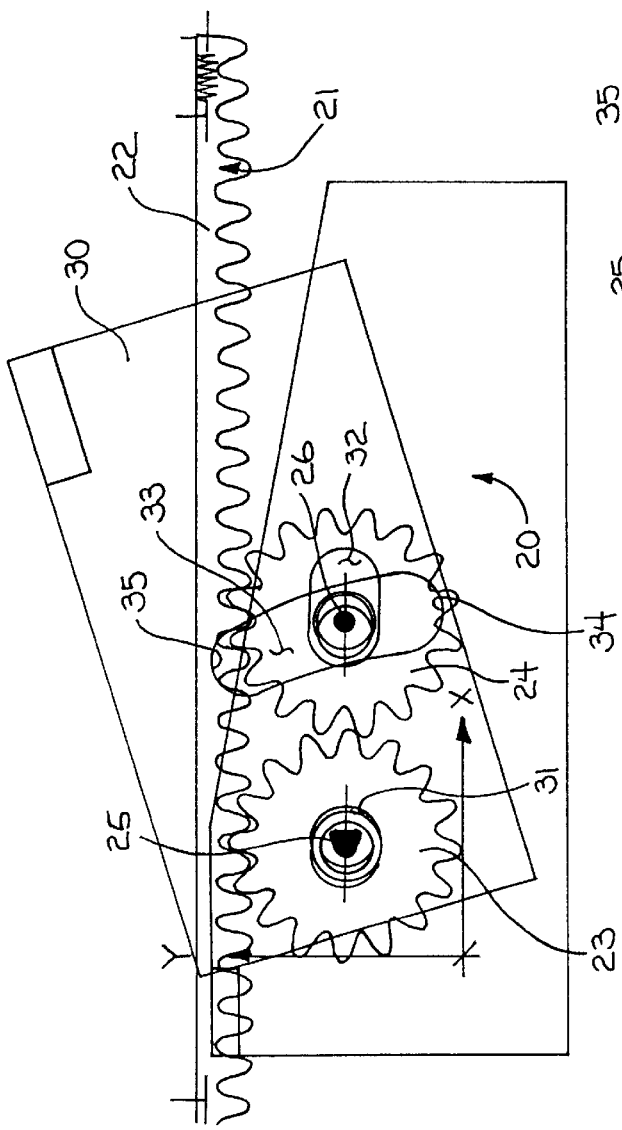
FIG. 5 is a view very similar to the view of FIG. 4.

Turning now to the drawings, in which like reference characters indicate corresponding elements throughout the several views, attention is first directed to FIG. 1 which illustrates a side elevational view of an adjustment mechanism 20 including a rack 21 comprising a toothed body 22. Further included are first and second pinions or gears 23 and 24 supported, such as by a base (not shown), for rotation and in constant meshing engagement with rack 21. First pinion 23 is supported by a first shaft 25 for rotation, and second pinion 24 is supported by a second shaft 26 for rotation. A complete description of a mounting of rack 21, first pinion 23 and second pinion 24 can be found in copending U.S. patent application entitled "Adjustable Support Apparatus and Architecture for Adjusting Support Apparatus", Ser. No. 09/092,675, filed Jun. 5, 1998 by the same inventor herein incorporated by reference. In the referenced application a rack is fixedly attached to a floor of a vehicle and first and second pinions are carried by a housing coupled to a seat. However, it will be understood by one skilled in the art that the rack and pinions can be transposed if desired. Furthermore, either the rack or the first pinion can be directly driven to move the seat.

In the present embodiment, pinions 23 and 24 are mounted to a seat by shafts 25 and 26, respectively, extending through a housing 27. It will be understood that housing 27 can be a portion of the seat or fixedly attached thereto. While only one adjustment mechanism 20 is illustrated for convenience, it will be understood that a similar member can be positioned on the opposite side of the seat (as illustrated in the above cited patent application).

Figure 6:
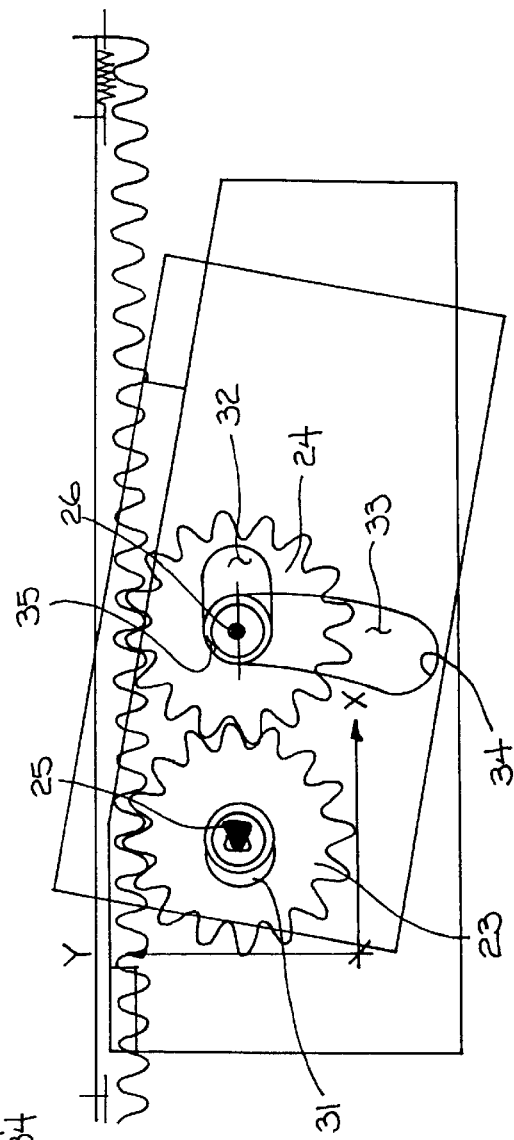
FIG. 6 is a view of the adjustment assembly of FIG. 1 with the first and second pinions shown as they would appear in the closed orientation and the cam shown as it would appear in the second position.

The invention further includes a cam 30. Cam 30 is mounted with the first and second shafts 25 and 26. First shaft 25 resides in a first elongate aperture 31 associated with first pinion 23, and second shaft 26 resides in a second elongate aperture 32 associated with second pinion 24. Elongate aperture 31 and 32 are formed in housing 27 and are included to allow limited horizontal movement of first and second shafts 25 and 26, respectively. Cam 30 is mounted for pivotal movement at first shaft 25. Cam 30 includes an elongate slot 33 including first and second ends 34 and 35. Second shaft 26 moves within elongate slot 33 as cam 30 is moved between first and second positions. In response to movement of cam 30 between the first and second positions, first and second pinions 23 and 24 will move between an open or disengaged orientation and a closed or meshingly engaged orientation as shown in FIG. 6.

First shaft 25 is mounted for slight movement of pinion 23, allowing for slight adjustments to permit the pinions to mesh even when the pinion teeth meet end to end. The movement of pinion 23 allows it to move sufficiently so that the pinions will always mesh and the mechanism can be locked in all positions. It will be understood that if desired, pinion 23 can be rigidly mounted with aperture 31 not elongated, thus preventing horizontal movement. Whether there is slight movement or not, first shaft 25 will be considered fixed in this embodiment for convenience of understanding. Second shaft 26 is mounted for movement in reciprocal directions relative first shaft 25 such that upon movement of cam 30 between the first and second positions, second pinion 24 will move in reciprocal directions for meshing engagement to and disengagement from first pinion 23. With first and second pinions 23 and 24 disengaged from one another in the open orientation, they will either roll freely along rack 21 or allow rack 21 to move freely in reciprocal directions relative the first and second pinions 23 and 24. Yet, with first and second pinions 23 and 24 engaged with one another in the closed orientation, they are prevented from rotating and running along rack 21 which effectively locks first and second pinions 23 and 24 with rack 21 at a fixed position.

To effect movement of second pinion 24 in reciprocal directions relative first pinion 23, cam 30 may be moved between first and second positions. In the first position of cam 30, second shaft 26 will reside against first end 34 of elongate slot 33 and in the second position of cam 30, second shaft 26 will reside against second end 35 of elongate slot 33. With first and second shafts 25 and 26 each mounted in the first and second elongate apertures 31 and 32, first and second pinions 23 and 24 will migrate and move as needed throughout movement of cam 30. The movement between the first and second positions shown in FIGS. 2–5 facilitates the meshing engagement of the first and second pinions 23 and 24 in the closed orientation as shown in FIG. 6. The pivotal action of cam 30 at first shaft 25 and the movement of second shaft 26 within elongate slot 33 between the first and second ends 34 and 35 cooperate for a camming action to move second pinion 24 in reciprocal directions relative first pinion 23 between the open and closed orientations.

Movement of shaft 26 along slot 33 from end 34 to end 35 passes over center, locking cam 30 in the second position, and thus entire adjustment mechanism 20 in the closed orientation. Thus, the horizontal position of the seat forming a portion of housing 27 is virtually infinitely adjustable, and can be rigidly fixed in the desired position by moving cam 30 over center into the second position.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An adjustment mechanism comprising:
   a rack;
   a first pinion meshingly engaging the rack for rotation of the first pinion and relative movement of the rack and first pinion;
   a second pinion meshingly engaging the rack for rotation of the second pinion and relative movement of the rack and the second pinion, the second pinion movable between an open position wherein the first pinion and the second pinion can be rotated, and an engaged position wherein the first pinion and the second pinion are mutually engaged with each other and the rack, preventing relative movement of the rack and rotation of the first pinion and the second pinion; and
   a cam engaged with the second pinion for moving the second pinion between the open position and the engaged position.

2. An adjustment mechanism as claimed in claim 1 wherein one of the rack and the first pinion are driven.

3. An adjustment mechanism as claimed in claim 1 wherein the second pinion is mounted on a movable shaft and the cam is pivotally mounted and includes an elongate slot formed therein, the movable shaft being slidably engaged through the elongate slot for a camming movement of the shaft between the open position of the second pinion and the engaged position of the second pinion in response to pivotal movement of the cam.

4. An adjustment mechanism as claimed in claim 3 wherein the cam is movable between a first position corresponding to the open position, and a second position corresponding to the engaged position, the second position of the cam being over center to lock the second pinion into the engaged position.

5. An adjustment mechanism as claimed in claim 3 wherein the first pinion is mounted on a fixed shaft and the cam is pivotally mounted to the fixed shaft.

6. An adjustment mechanism as claimed in claim 3 further including a housing having an elongate aperture mounting the moveable shaft for allowing movement of the second pinion between the open position and the engaged position.

7. An adjustable seat comprising:
   a seat frame;
   a rack mounted to a substrate;
   a first pinion rotatably carried by the frame and meshingly engaging the rack for movement of the frame relative the rack;
   a second pinion rotatably carried by the frame and meshingly engaging the rack for relative movement of the frame relative the rack, the second pinion movable between an open position wherein the first pinion and the second pinion can be rotated, and an engaged position wherein the first pinion and the second pinion are mutually engaged with each other and the rack, preventing relative movement of the rack and frame, and rotation of the first pinion and the second pinion; and
   a cam engaged with the second pinion for moving the second pinion between the open position and the engaged position.

8. An adjustable seat as claimed in claim 7 wherein one of the rack and the first pinion are driven.

9. An adjustable seat as claimed in claim 7 wherein the second pinion is mounted on a movable shaft and the cam is pivotally mounted and includes an elongate slot formed therein, the movable shaft being slidably engaged through the elongate slot for a camming movement of the shaft between the open position of the second pinion and the engaged position of the second pinion in response to pivotal movement of the cam.

10. An adjustable seat as claimed in claim 9 wherein the cam is movable between a first position corresponding to the open position, and a second position corresponding to the engaged position, the second position of the cam being over center to lock the second pinion into the engaged position.

11. An adjustable seat as claimed in claim 9 wherein the first pinion is mounted on a fixed shaft and the cam is pivotally mounted to the fixed shaft.

12. An adjustable seat as claimed in claim 9 further including a housing forming a portion of the seat frame and having an elongate aperture mounting the moveable shaft for allowing movement of the second pinion between the open position and the engaged position.

13. An adjustable seat as claimed in claim 12 wherein the housing is an integral portion of the frame.

\* \* \* \* \*